United States Patent [19]

Rohatyn

[11] Patent Number: 4,554,502
[45] Date of Patent: Nov. 19, 1985

[54] POWER FACTOR CORRECTION SYSTEM

[76] Inventor: Frederick Rohatyn, 166-10 15th Dr., Beechhurst, N.Y. 11357

[21] Appl. No.: 480,496

[22] Filed: May 6, 1983

[51] Int. Cl.$^4$ .............................................. G05F 1/24
[52] U.S. Cl. .................................. 323/208; 323/256; 323/260
[58] Field of Search ........ 323/205, 208, 233, 255–256, 323/259, 260, 262, 340–342, 344, 352, 361

[56] References Cited

U.S. PATENT DOCUMENTS

| | | | |
|---|---|---|---|
| 1,992,809 | 2/1935 | Blume | 323/208 |
| 2,325,936 | 8/1943 | Blume | 323/262 |
| 2,751,551 | 6/1956 | Jansen | 323/205 |
| 2,966,626 | 12/1960 | Kalina et al. | 323/260 |
| 3,373,345 | 3/1968 | Hung | 323/260 |
| 3,422,343 | 1/1969 | Specht et al. | 323/205 |

Primary Examiner—Peter S. Wong
Attorney, Agent, or Firm—Erwin S. Teltscher

[57] ABSTRACT

A power factor correcting system for compensating a lagging power factor reactance for an electric load plurality fed from at least one pair of incoming service lines, comprising, in combination: capacitors for producing leading reactive power; a series transformer, having primary and secondary winding, the secondary winding being connected in series with affected power lines; a variable transformer fed from the service lines and feeding the primaries of the series transformer; the capacitor instrumentality being fed from the affected incoming power lines with a voltage which varies in magnitude as needed, being the sum of the power line voltage plus/minus the variable series transformer secondary voltage; with the variable transformer through feeding of the primaries of the series transformer causing the required voltage variability in the series transformer secondary and subsequently in the feeding voltage applied to the capacitor; sensing instrumentality to detect presence of lagging reactive power requiring compensation; automatic control instrumentality to actuate the variable transformer to vary the voltage in one direction or the other until it has reached a discrete magnitude resulting in a precise addition or substraction of the thus introduced leading reactive power which makes the power factor be corrected to the preset accurate value.

20 Claims, 11 Drawing Figures

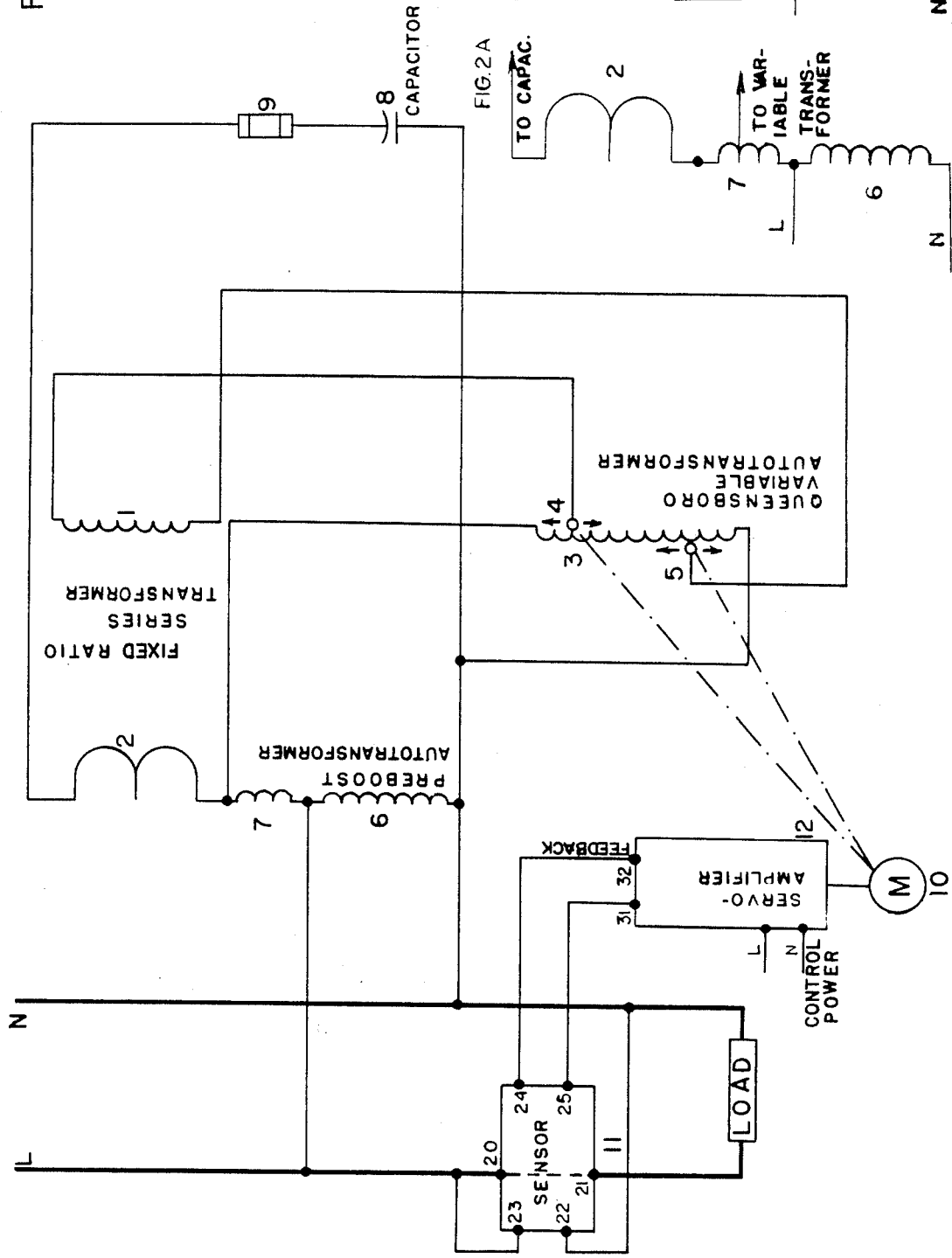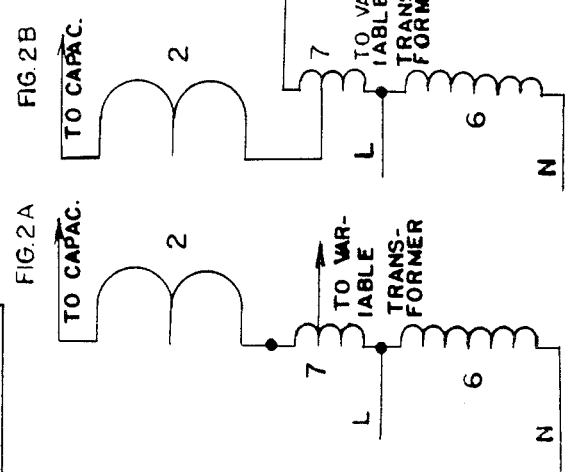
FIG. 2

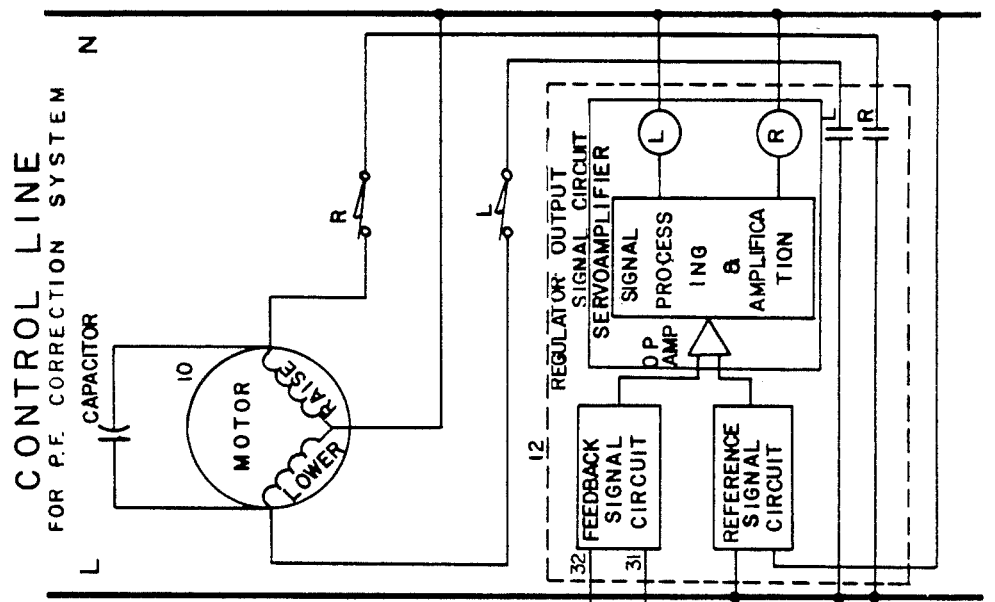
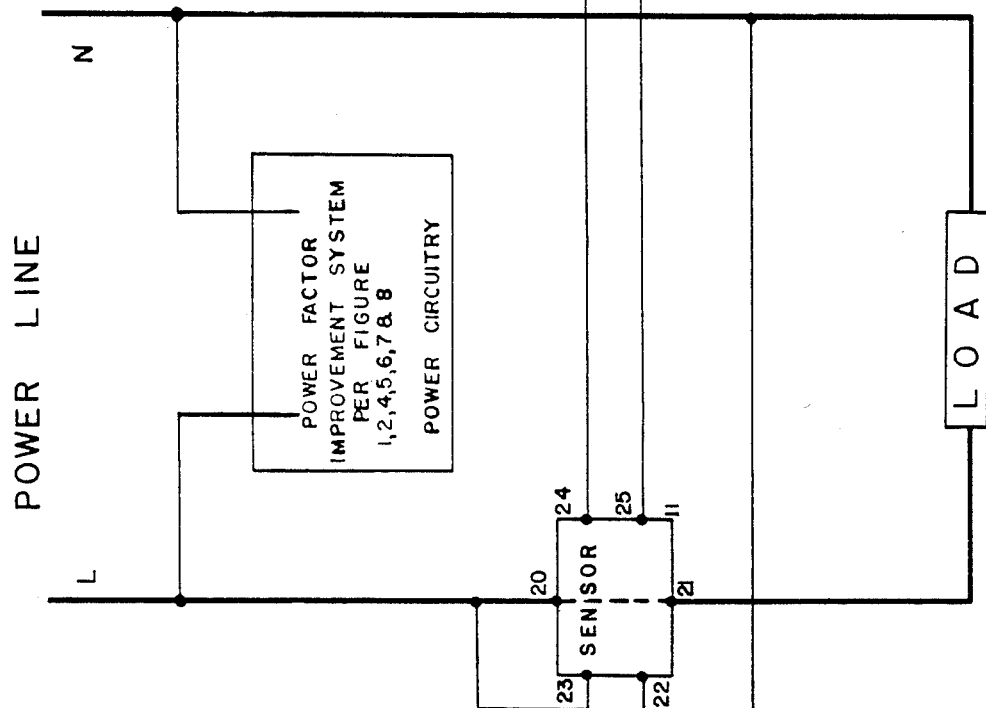
FIG. 8

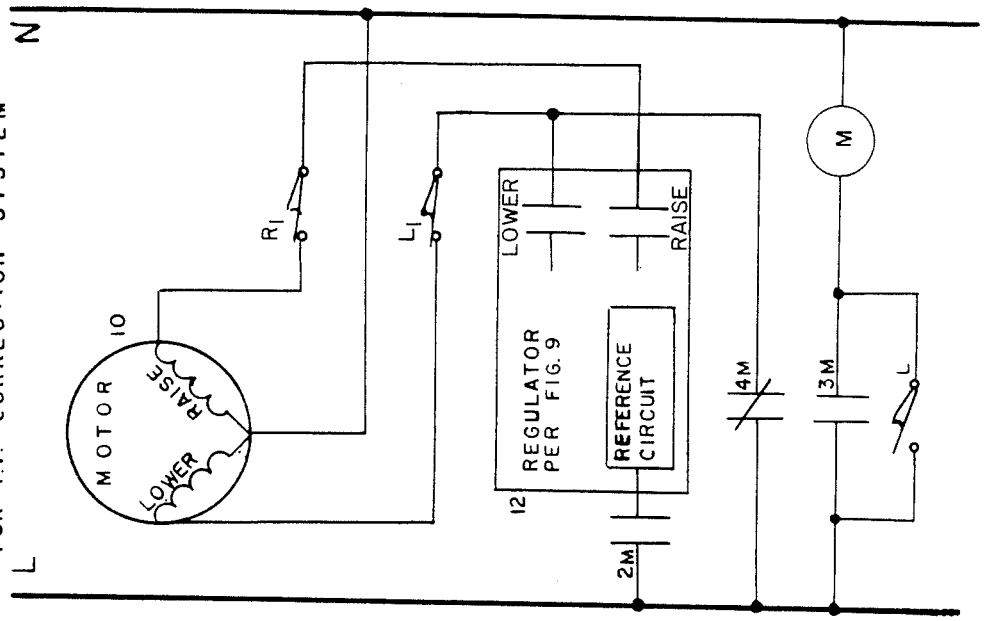
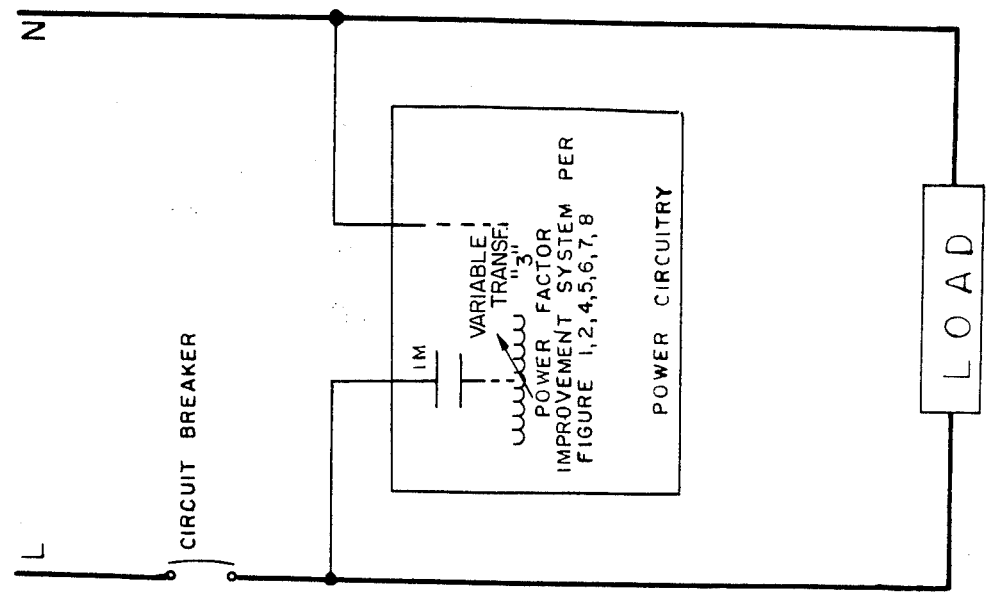

POWER FACTOR CORRECTION SYSTEM

REFERENCE TO RELATED APPLICATION

The following relates to continued developments for conditioning service lines from utility companies as in my application Ser. No. 271,202, filed June 8, 1981, now U.S. Pat. No. 4,438,387, which is incorporated herein in its entirety by reference.

BACKGROUND OF THE INVENTION

The generally accepted method for compensating a lagging power factor reactance of an inductive load is by capacitors which provide a leading power factor.

In order to achieve an ideal compensation, the magnitude of the compensative leading reactive power should be made equal to the magnitude of the existing lagging reactive power, otherwise the system becomes undercompensated or overcompensated. In order to achieve an acceptable degree of closeness to the ideal compensation, it has been proposed, in the prior art, to subdivide the required total shunting capacity into a plurality "n" of capacitors, which are paralleled 1, 2, 3, ... n by switching the capacitors into and out of circuit. The mentioned capacitor switching technique dates from before 1918; using mainly from six to nine parallel capacitors, switched by contactors whose coils are energized and de-energized by an automatic control circuitry activated by the sensing of either the power factor or the ratio of the leading to lagging reactive current or reactive power.

One great disadvantage of the capacitor switching technique is that it compelled one to compromise at a degree of compensation which deviates undesirably from the ideal value. When using the six capacitors, for example, the deviation would amount to 1/12 of the compensable value.

In the prior art there existed fear of the so called over improvement, a name given to a power factor correction better than 0.9. With the combination of increments in sizeable capacitor steps and abrupt full current switching, over improvement could cause over voltages of as much as 40% on the affected power lines and subsequent damage to motor driven equipment under certain conditions of operation.

Another disadvantage is in the capacitor switching itself. With every capacitor being switched, a surge, a spike or the like results, causing a perceivable flicker which is extremely detrimental to sensitive critical electronic loads connected to the line. In fact, capacitor switching is a primary cause of trouble in computers receiving power from lines. True, in the capacitor switching systems today, switching is made at zero voltage crossing, but this feature achieves little, because in capacitors when the voltage curve is at zero, the current curve is at the peak and vice versa.

Even in absence of sensitive electronic loads, the prior art which uses capacitor switching, which is a rough and violent physical action, frequently results in capacitor fuse blowing. This causes watt losses, kilowatt demand increases operational expenses during any interim until those fuses are replaced.

Another trouble occurs with the prior art when the load on the power lines consists of rectifiers, and particularly of rectifiers with forced commutation, which as it is known, generate a very substantial reactive power component and also very substantial 5th, 7th and 11th harmonics. Danger exists that at a certain switching stage with the rectifier transformer winding a resonant circuit whose frequency closely coincides with the frequency of said 5th harmonic making the current increase dangerously uncontrollable.

Another disadvantage of the prior art was that the capacitors had to be furnished with discharging resistances. When there was a power failure, or power disconnection, or a fuse blowing—and fuses blew frequently, the circuit had no path of discharge through anywhere, and without the discharge resistors, the capacitors would explode at the next energization, when added to the existing charge. These discharge resistors have the disadvantage of having certain cost, but more importantly, they consume energy incessantly.

Another disadvantage of the prior art consists in the inability of recession of the bottom portion of the reactive power correction range. When the magnitude of a corrective reactive power is being studied, the upper limit which is the highest leading reactive power, is exactly determined. As to the lowest reactive power ever needed, seldom values lower than 40% of highest reactive power are necessary. Yet in the prior art the bottom of any corrective reactive power range is always zero, which in addition to being unnecessary is inconvenient.

Another disadvantage of the prior art consists in the fact that the capacitors work at all the times at their full rated voltage, and at certain switching instances the peak voltage is enhanced beyond the rated peak voltage of the capacitors which can destroy or reduce the life time of these circuit components.

This invention increases and decreases the compensatory reactive power of the electrical system instead of a process of adding and/or subtracting capacitors, by raising and/or lowering the voltage applied to a capacitor or capacitors. It may be seen that the effect of the power change is proportional to the square of the voltage applied to the capacitors; by comparison, the prior art uses capacitor size change, whose effect is proportional to only the first power of the capacitor size.

SUMMARY AND OBJECTS OF THE INVENTION

Accordingly, this invention has as its objective the provision of a shunt compensation system for power lines to correct lagging reactive power and subsequently also to improve lagging load power factor.

A further object of this invention is to provide a device as characterized as above, in which the voltage applied to the traditional capacitors is modulated rather than the known prior art techniques of abruptly adding or subtracting capacitors which intrinsically involve surges, spikes or the like.

A further object is to provide a device which benefits from the effect of the circuitry that allows corrective reactive power change to be proportional to the square of the voltage applied to the capacitors in contrast to the prior art which merely uses capacitor size change, in which the associated effect is proportional only to the first power of the capacitor size.

A further object of this invention is to provide a device as characterized as above which suitably conditions the voltage which the capacitor receives in such a manner that the capacitor's rated peak voltage is only seldom reached and most of the time the voltage applied to the capacitor is kept substantially below the rated voltage, making the capacitor life to be practically eternal.

A further object of this invention contemplates providing the device as characterized as above which is extremely reliable in construction and durable in use.

The most important object of this invention contemplates a device as set forth above which while providing to the power lines cancellation of lagging reactive power and consequently improvements of the power factor, and subsequently substantial reduction in kilowatt demand and watt losses,—it will in no way affect sensitive electronic equipment connected to the pertaining power lines; said electronic equipment which includes computers, Cat Scans, military and communication equipment belonging to the critical load category will operate with no failures, no curtailing of life, no (computer) errors.

A further object of the invention provides a device which in spite of the incomparably superior performance will be competitive in cost with devices of the prior art. In order to achieve this object, this invention provides a device which as one of the measures allows the use of capacitors having a higher rated voltage than the rated voltage of the affected power lines.

A further object of this invention is to provide a device characterized as above which permits reaching the theoretical optimum of power factor improvement, i.e. reaching unity power factor without incurring the hazard of thereby generating over voltage, without incurring the danger of damage to motor driven equipment fed from the affected power lines.

A further object of this invention is to provide a device characterized as above, in which capacitor protection by means of a fuse, though not prohibited, is unnecessary; and when a fuse is inserted in the capacitor circuit, its likelihood of ever blowing is nil, which is a feature which saves energy, reduces the kilowatt demand and maintenance cost.

A further object of this invention is to provide a device characterized as above which would not produce over voltages at times of power return after a power interruption.

A further object of this invention is to provide a principle applicable to any alternating current voltage class, any technical power line frequency, any power line number of phases.

These and other objects will be made manifest when considering the following detailed specification taken in conjunction with the accompanying drawing figures.

BRIEF DESCRIPTION OF THE DRAWINGS

FIGS. 2 and FIGS. 2A and 2B detail schematics similar to FIG. 1 which includes a pre-boost auto transformer which permits adaptation of the system to be a substantially higher capacitor voltage rating plus reducing of the unnecessary bottom portion of the reactive power correction range, both of these measures having the purposes of cost reduction.

FIG. 5 is the same diagram as FIG. 2, except that a 2-winding isolated transformer is inserted in lieu of the pre-boost autotransformer.

FIG. 7 uses a low voltage variable autotransformer as in FIG. 2, but said low voltage variable autotransformer is fed from the high voltage lines through the intermediary of a 2-winding isolating transformer. Both FIG. 6 and FIG. 7 are shown, because in certain applications system FIG. 6 may be more advantageous, in other applications system FIG. 7 may be more economical.

FIG. 8 delineates a system in greater detail representative of the control systems for FIGS. 1–7.

FIG. 9 shows the way in which the device per FIGS. 1, 2, 4, 5, 6 or 7 resets itself to the position of the lowest capacitor feeding voltage at the time power is interrupted, in order to start with the lowest available voltage, for which there has been applied a patent application, now U.S. Pat. No. 4,438,387, Ser. No. 271/202, mentioned supra, with which the present device safety is enhanced.

BRIEF DESCRIPTION OF THE PREFERRED EMBODIMENT

Figure 1:
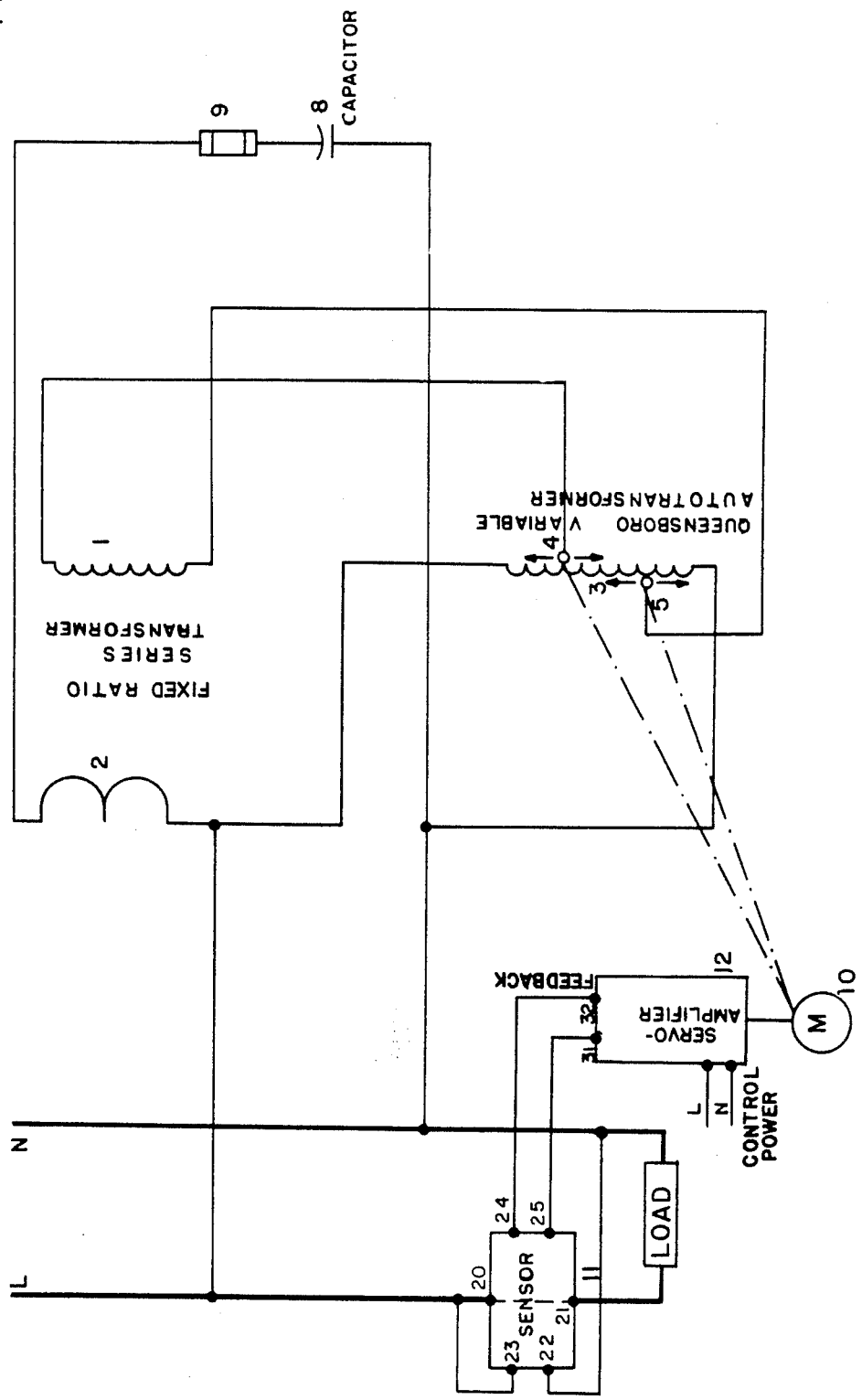
FIG. 1 shows the basic schematic of the apparatus according to the present invention which operatively conditions an alternating current single phase system.

Referring to the drawings, wherein like reference numerals refer to like parts in the various drawing figures, the reference numeral refer generally to embodiments of a power factor correction system according to the present invention.

More particularly, FIG. 1 shows the simplified arrangement of a single phase system. An incoming power line is shown, L being the line terminal. N being the neutral; the system feeds a load which is assumed to be partially inductive, requiring leading reactive power compensation. This reactive power compensation is achieved by a shunt circuitry, comprising a fix-ratio series transformer 1, 2 and a variable transformer 3. The secondary 2 of the fixed-ratio series transformer is connected in series with the power line L; its primary 1 is fed from the current collectors 4 and 5 of the variable transformer 3. The variable transformer 3 is a product of the Queensboro Transformer & Machinery Corp.; it is of the column type and preferably has its current collectors 4 and 5 constituted by carbon rollers which glide on the windings of the variable transformer coil columns. These carbon roller current collectors 4 and 5 in the Queensboro Transformer are driven from a capacitor gear motor 10 via bevel gears and lead screws in such a way that when the current collector 4 rides in the direction up, the current collector 5 will ride at the same pace, and speed in the opposite direction. The current collectors 4 and 5 are mutually displaced 180° on the circumference of the coil surface, so that if the collector 4 glides on the front of the coil, the collector 5 will glide in the opposite direction on the rear of the coil. The variable transformer 3 coil is energized at its fixed end terminals from the line voltage from lines L–N. When the position of the current collector 4 coincides with the position of current collector 5, both draw current from the same turn of the variable transformer 3, and the resulting voltage across collectors 4 and 5 becomes zero. When the position of the collector 4 has reached one end of the coil, say, the top, and subsequently the collector 5 has reached the bottom, the voltage at collectors 4 and 5 becomes equal to the line voltage and the line voltage is fed into the primary of series transformer 1. This voltage will induce a certain voltage in the secondary 2 of the series transformer, and the magnitude of this voltage will depend on the primary to secondary turns ratio. If this turn ratio is 1:1 the voltage produced by the line plus that of the primary 1 of the series transformer becomes double the line voltage. By the same reasoning, when the contacts 4 and 5 coincide, i.e. when they have met on the lateral centerline of the coil column, the line voltage plus the secondary voltage of the series transformer becomes equal to the line voltage. For any position of the contact 4 between the lateral, zero centerline and its uppermost position, the voltage which is applied to a capacitor 8 varies between the magnitude of the line voltage and the highest voltage available from the series transformer 1. The voltage can be changed at will e.g. manually, by pushbuttons or by automatic control in infinitely small variations and brought extremely accurately to a magnitude needed.

When the collector 4 reaches the other extreme, lowermost position in which case the collector 5 reaches its uppermost position, once again the magnitude of the voltage available on collectors 4 and 5 is the line voltage. But as it may be seen from FIG. 1, its polarity is reversed. This reversed polarity reverses the direction of the magnetic flux in the series transformer 1, 2, in consequence of which the voltage induced in the secondary 2 of the series transformer 1, 2 will no longer add, but subtract from the line voltage. In the case of a series transformer winding ratio of 1:1, when collector 5 reaches the top, the voltage applied to the capacitor 8 becomes zero, and according to the position of the carbon roller current collectors 4, 5, the total voltage ranges from zero to double line voltage can be achieved, and achieved in infinite increments.

Capacitor feeding range extending from a certain maximum down to zero is feasible with the device of this invention. Extending said range down to zero, which means extending the range of the compensating leading reactive power down to zero is the only possibility achievable in the prior art, but this invention also provides a practical possibility of having the lower limit to be greater than zero, and by doing so, having the advantage of reducing the size, and subsequently the cost of the device. Zero voltage applied to the capacitor, which is the same as zero leading reactive power, is never necessary, and extending this reasoning it might be said that less than 40% of the maximum required corrective leading reactive power is seldom necessary in practical power line power factor improvement tasks. The ability to shift the corrective lagging reactive power range's bottom border resulting in reduction of the size of device is one of the economic advantages of this invention. The numerical example presented hereunder will illustrate it:

We assume, we have a 200 kVA, 1 phase, 60 Hz, 240 V, power line, requiring a maximum reactive power correction of 100 kVAr. We are looking for the most favorable solution. Let us first analyze the use of the prior art, assuming we utilize 9 capacitors of 11.1 kVAr, 240 V each, achieving by switching the following reactances:
99.9/88.8/77.7/66.6/55.5/44.4/33.3/22.2/11.1/0.0
kVAr, of which the last 3 to 4 steps are unnecessary, but if eliminated, the device becomes more expensive, because of the higher current rated switches required; less practical, because elements would no longer be interchangeable.

As the second comparative example, we take the above described voltage variation system, having a 1:1 primary to secondary winding series transformer ratio, using a single capacitor 100 kVAr, 480 V, costing approx. $\frac{1}{4}$ of a 100 kVAr, 240 V single capacitor, and even less, when compared to 9 subdivided capacitors. The voltage range applied to said 100 kVAr capacitor is 480 V to zero. One half of this power is supplied directly from the lines, the other half, i.e. 50 kVA is supplied by the series transformer 1, 2, whose rated capacity therefore becomes 50 kVA, and likewise the variable transformer 3 which has to feed winding 1 of the series transformer, must also be rated 50 kVA.

Let us now show a third comparative example, in which the bottom range portion is deleted. We assume now a series transformer, whose primary 1 to secondary 2 winding ratio is 1:0.5. The highest voltage induced in winding 2 will be 120 V; consequently the lowest voltage applied to the capacitor becomes $240-120=120$ V, the highest voltage $240+120=360$ V. The capacity of the series transformer becomes 33.3 kVA, which represents a $\frac{1}{3}$ saving in capacity, $\frac{1}{4}$ saving in the cost of both the series transformer as well as of the variable transformer. However, in this example we must use a 360 V capacitor, which for the same 100 kVAr size is more expensive than the 480 V capacitor of example 2. The diagram FIG. 2 which will be described later, has the purpose of offsetting this disadvantage.

The capacitor 8 disposed in parallel with the load in FIG. 1 has to withstand the highest voltage the system can produce. As it is known, the higher the rated voltage of a capacitor, the lower its capacity in microfarads for a given kVA rating, and consequently the lower its price. This is one of the economic advantages of this invention: capacitors for higher rated voltages are applicable here. The next economic advantage compared to the switching technique used in the prior art is that a single full size capacitor can be used; there is no need to subdivide it into a number a capacitors of smaller sizes. A single larger capacitor is more economic in cost and in size and in the expense of mounting and wiring. The capacitor 8 is shown on schematic diagrams FIGS. 1, 2, 3, as protected by fuse 9. This fuse has been inserted to show that in general, the conventional practice can be followed, and a fuse embodied in the system. Yet is unnecessary, because with the absence of abrupt leading reactive CURRENT changes, chances of blowing of such a fuse are nil.

A simplified diagram of the automatic control is illustrated in FIG. 1; a diagram in greater detail, but still simplified is illustrated in FIG. 8. In FIG. 1 the motor 10 drives the carbon roller current collectors 4 and 5, to wit: the collector 4 up and the collector 5 down when it rotates clockwise, the collector 5 up and the collector 4 down on counterclockwise rotation. The motor 10 has clockwise (raise) and counterclockwise (lower) motion windings, shown in FIG. 8. A reactive power sensor 11 as shown, has in single phase devices 2 current terminals 20, 21, which are illustrated as interrupting the L power line. It has 2 potential terminals, one connected to power line L (23), one to the neutral N (22). Instrument transformers have been omitted for the sake of simplicity and clear understanding, though in practice the use of current sensing via a current transformer is unavoidable, and in many cases a potential transformer is necessary. The signal generated by the sensor 11 which appears on terminals 24, 25, is pickeed up by servoamplifier terminals 31, 32. On FIG. 8 it is shown that the servoamplifier 12 has a reference signal circuit, fed from the control lines L, N, and in the usual way this reference signal circuit comprises zener diodes, and on its output it includes a potentiometer setpoint adjustment. The feedback from the reactive power sensor 11 which enters the servoamplifier 12 with terminals 31, 32, passes, as shown on FIG. 8, through a feedback signal processing circuit. The two signals, reference and feedback are then compared, again as shown on FIG. 9, in an operational amplifier which produces a positive, or a negative error signal. It may be seen on FIG. 8 that thereafter the error signal passes through a signal process and amplification circuit. The processed and amplified signal, as shown on FIG. 9, energizes either relay coil L (lower) or coil R (raise). When coil L is energized, the pertaining normally open contact L closes, which causes current to flow from control line L via a normally closed limit switch L to the "Lower" winding of Motor 10, which will cause a counterclockwise motion of the motor 10. The motion of the motor will make, as illustrated on FIG. 1, current collector 4 travel down, current collector 5 travel up which will cause lowering the voltage applied to capacitor 9. The motion will stop when the reactive power compensation has reached its preset value, at which time moment the magnitude of the error will become close to zero, as close to zero, as the rated accuracy of the regulator amounts to. When the error becomes zero, coil L becomes de-energized, its pertaining contact L opens, the feeding line to the "Lower" winding of the motor is interrupted, the motor stops, the travel of the current collector stops, the process of voltage change stops, the process of correction of the reactive power stops, and subsequently the process of power factor correction is so far, completed. All these motions stop also when the current collectors hit their mechanical limit position thereby engaging the normally closed limit switch L, as also shown in FIG. 8.

When the error is negative, coil R will be energizeed, contact R closes, current flows from Line L via the normally closed limit switch R to the "Raise" winding of motor 10, whose motion will make current collector 4 travel up, current collector 5 travel down, causing gradual raising of the voltage applied to capacitor 9, causing gradual increase of compensating leading reactive power. The motion will stop when again the magnitude of the error reaches zero within the rated accuracy of the regulator. The motion will also stop when the current collectors reach their mechanical extreme position, thereby engaging limit switch R.

The regulation of the reactive power is then electrically translated to a thereto closely related power factor regulation. In lieu of electromechanical relays, solid state relays can be used. As a refinement, the "raise" and the "lower" relays will be cross-interlocked utilizing auxiliary contacts, to make the control circuitry failsafe. A further refinement is an addition of a P-I-D (proportional/integral/derivative) module within the signal Processing and Amplification section.

In lieu of the mentioned error detection system a microprocessor can be used. A microprocessor would be sampling the reactive lagging power plus the reactive leading power and use three point control by disabling the seek operation until a leading lagging ratio change is sensed. Also a microcomputer can be used for the control.

Whichever method is used, extreme accuracy of compensation is achieved, to which the prior art of capacitor switching can never compare. As mentioned, the per kVA capacitor cost is very much lower if the rated voltage is increased. FIG. 2 shows an adaptation of the method shown in FIG. 1 for the use of capacitor voltage ratings substantially higher than the line voltage available. In a general type of application, the diagram of FIG. 2 is more likely the one to be used, because of the easy adaptation of an adequately high voltage applied to the capacitor and just as importantly, because of the design-wise easy rescission of any unwanted bottom range portion of the reactive power compensatory bandwidth. In FIG. 2 a pre-boost autotransformer 6, 7 is added to the circuitry of FIG. 1, with 6 designating the root winding, i.e. the primary, 7 designating the boost winding, making 6+7 the secondary. The highest voltage, which must be made equal to the rated capacitor voltage and which gives the highest leading reactive power is equal to the voltage:

$$\text{Voltage 7 to neutral} + \frac{\text{Voltage 7 to neutral}}{\text{Turn ratio winding 1:winding 2}}$$

The lowest voltage obtainable with this apparatus which produces the lowest available leading reactive power is equal to:

$$\text{Voltage 7 to neutral} - \frac{\text{Voltage 7 to neutral}}{\text{Turn ratio winding 1:winding 2}}$$

The highest voltage can be selected as high as 5 times the rated line voltage for example, if dielectric considerations and Electrical code restrictions permit same.

On FIGS. 1 and 2, instead of having the load plus the compensating circuitry fed from the power line L and the neutral N, they can be fed from line-to-line.

On FIG. 2 the variable transformer 3 is fed by a potential at which the autotransformer boost winding 7 is connected to the series transformer 2. This is not absolutely necessary. FIG. 2A shows a variation in which the variable transformer 3 is fed from a tap of the autotransformer boost winding 7, i.e. from a potential lower than in FIG. 2. The lowest practical potential is the point in which the autotransformer root winding 6 is connected to the boost winding 7. FIG. 2B illustrates a variation in which the variable transformer 3 is fed from a potential higher than the one shown on FIG. 2.

Figure 3:
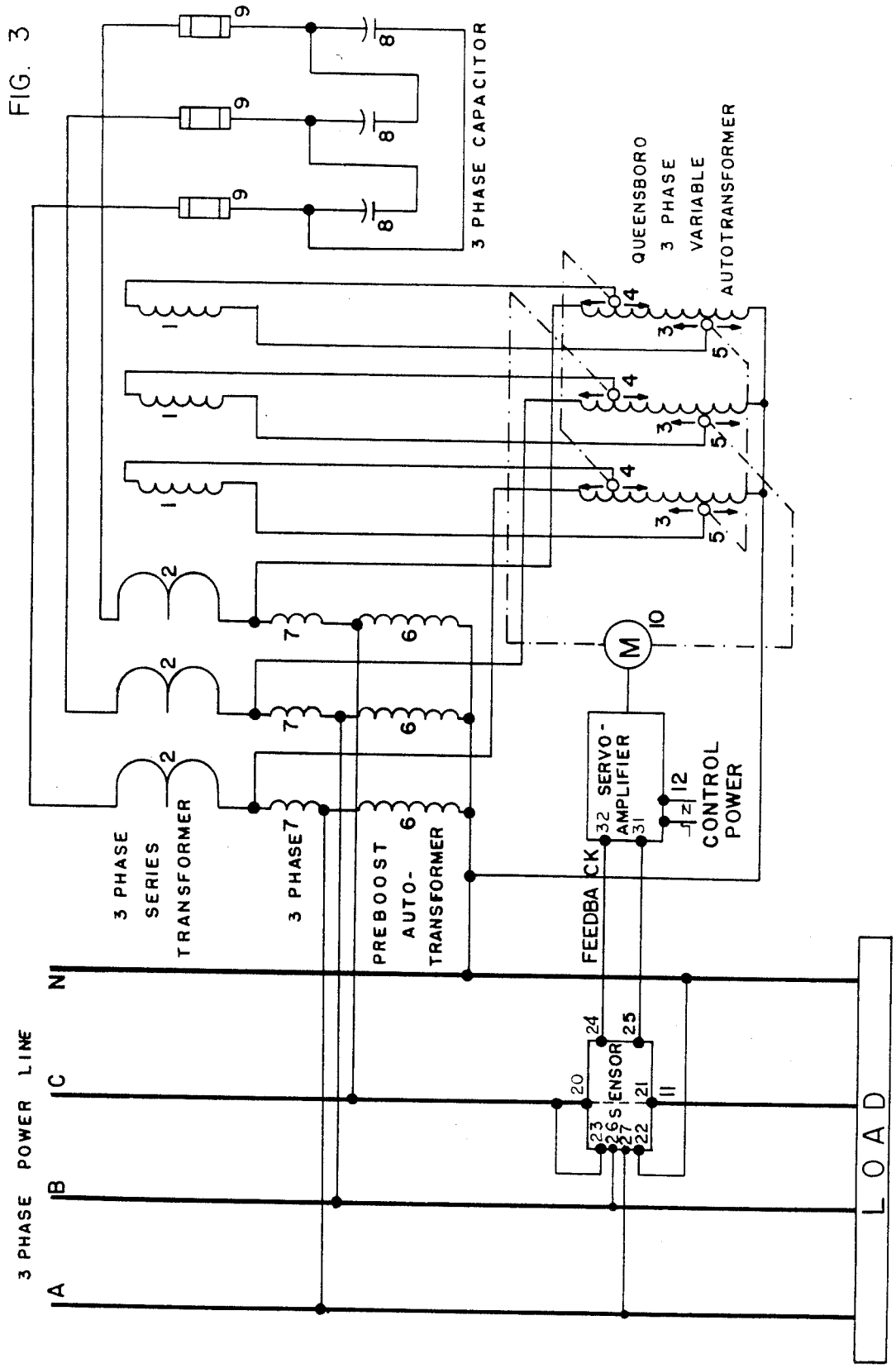
FIG. 3 delineates a schematic similar to FIG. 2 adapted for a three phase system.

FIG. 3 shows the same system as FIG. 2, but adapted to a 3 phase, 4 wire power line. All transformers illustrated should preferably be of the 3 phase, core type. Otherwise the function is the same as described for FIG. 2.

The servoamplifier 12 is the same as in FIGS. 1 and 2. The sensor 11 is shown on FIG. 2 in a presentation valid only for a 4 wire, balanced phase system, and requires a description for other systems. The sensor 11 shown on FIG. 3 has a single current path shown by the interrupted line between current terminals 20, 21, inserted in phase C. It shows 3 potential paths, one being 27 to 21—phase A to neutral, the second 26 to 21—phase B to neutral, the third 22 to 21—phase C to neutral. In a 3 phase, 4 wire unbalanced load system the same 3 voltage paths are needed, but also 3 current paths, which means all 3 phases, A, B, C are interrupted in the way shown for phase C. In a 3 phase, 3 wire balanced load system, there is one current path; referred to FIG. 3 it would be in phase C, terminals 20, 21. There will be one only voltage path, between phases A and B only, i.e. between terminals 26 and 27. Terminals 22 and 23 would be omitted. This particular circuitry, being the simplest, is advantageous and can be used in lieu of the system illustrated on FIG. 3.

On FIGS. 1, 2 and 3 the reversible polarity variable voltage is obtained from the Queensboro Column Type Variable Transformers which are an advanced technical development electrically, magnetically and mechanically. They can be made for any kVA rating to thousands of kVA; they provide infinite resolution, sparkless commutation, they have magnetically balanced fields obtained by equilibrating windings, they have well engineered mechanical movements on ball bearings good for years of unattended service. However, substitute solutions are possible.

ALTERNATE EMBODIMENTS

Figure 4:
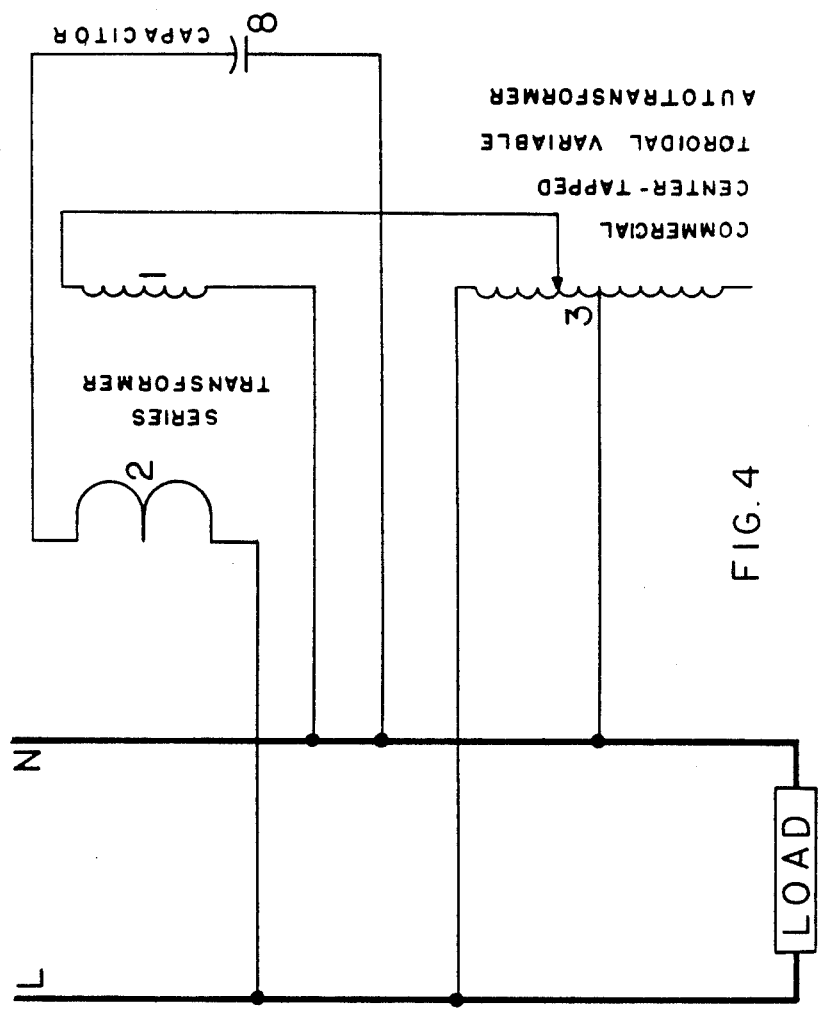
FIG. 4 delineates an alternative power circuit solution to that which is shown in FIG. 1 including a center tapped toroidal variable transformer, to demonstrate that for limited power ranges the idea of this invention can be adapted also to the use of readily available commercial power components.

IN FIGS. 1, 2 and 3, which represent preferred embodiments, the Queensboro Column type reciprocal motion variable autotransformer has been used. As described, it is a high-technology machine, offering almost perfect performance, it is suitable for unattended service, and has no size limitation. A question may arise whether the commonly available toroidal variable transformers, a (variac, powerstat), a cheap, limited size device (at present technology), device can be utilized. The answer is affirmative, if there is awareness of the shortcomings in reliability and in the need for very substantial kVA capacity derating, when paralleled. FIG. 4 shows a solution utilizing a center-tapped toroidal autotransformer, the function is self-explanatory.

Figure 5:
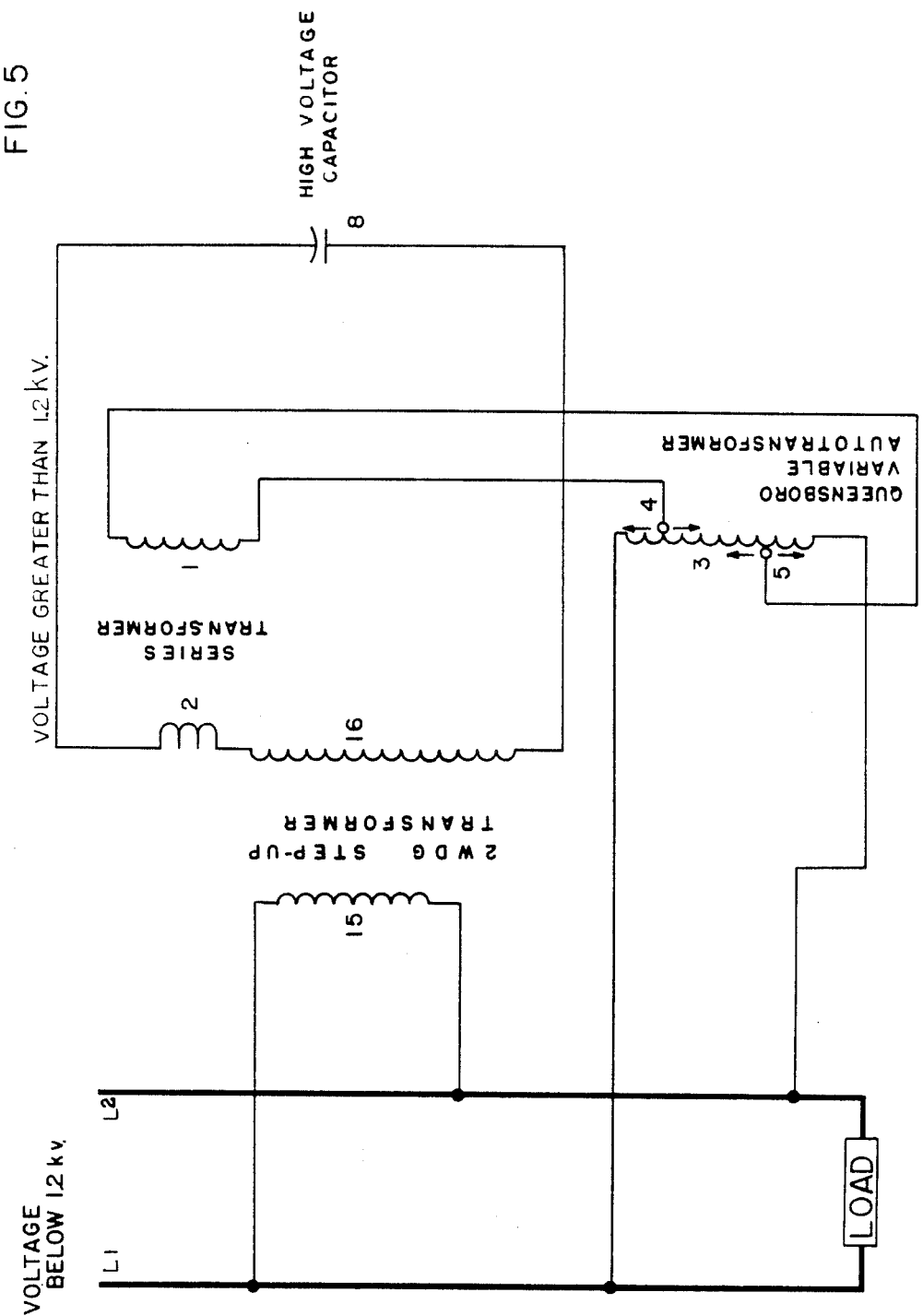
FIG. 5 teaches how to proceed when the power lines belong to the ANSI low voltage class, i.e. below 1.2 kV, yet the power capacity is so very large that it becomes economic to use a capacitor having its voltage rated higher than the 1.2 kV ANSI class.
Figure 6:
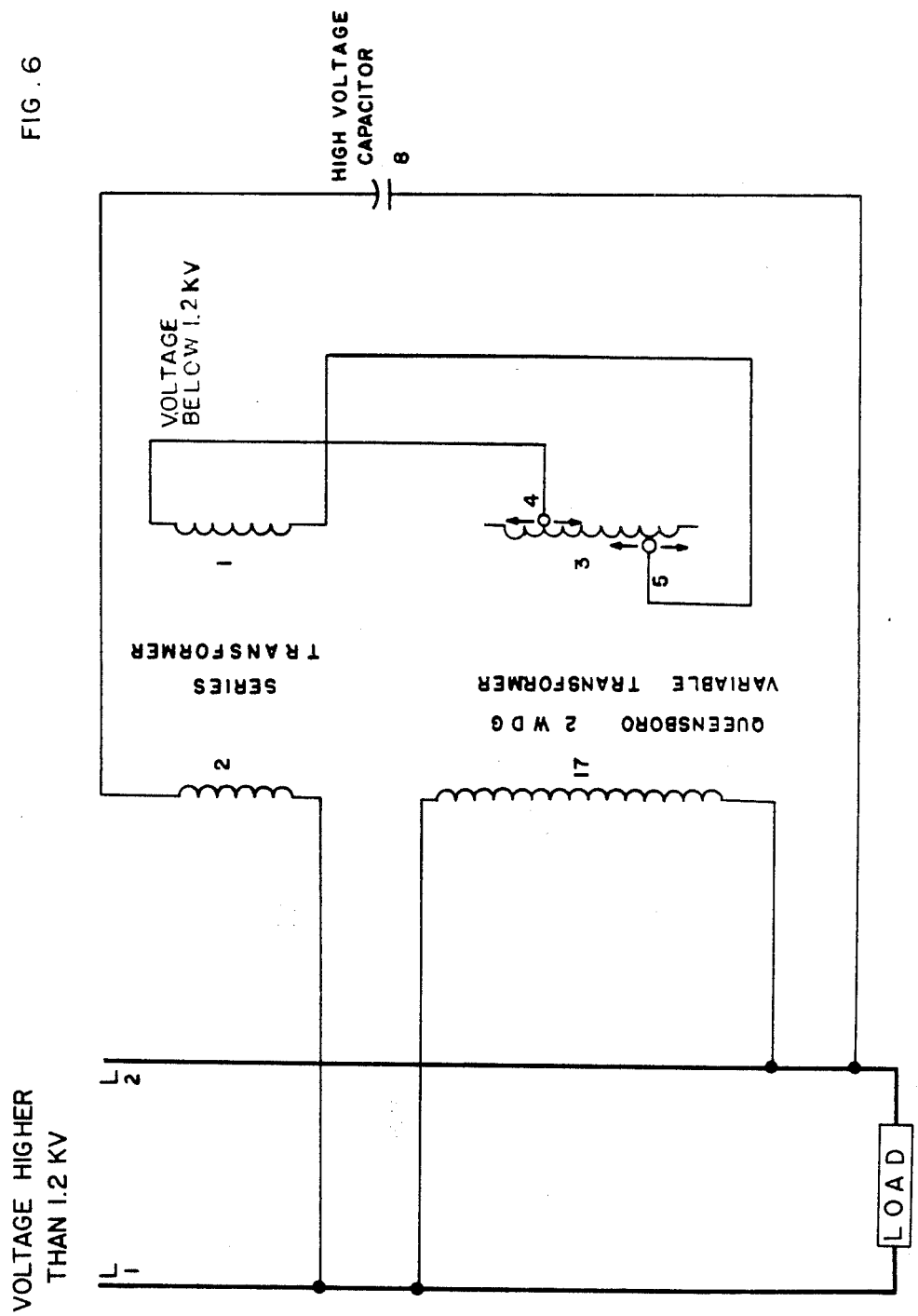
FIG. 6 refers to a case where the power lines are high voltage, typically not exceeding 15 kV, high. The circuitry is once again an adaptation of FIG. 2, in which the variable transformer is a 2-winding isolated transformer.

For voltages classified as high voltage, but not exceeding, say, the ANSI 25 kV class, FIG. 6 shows a solution to the problem where the power line voltage remains within the category of low voltage i.e. below 1.2 kV, whereas for reason of cost it is intended to use a compensating capacitor rated at a high voltage, e.g. 15 kV. The system is, as shown, similar to the system represented by FIG. 2, except that a two winding transformer has been inserted, the primary being the low voltage winding 15 and the secondary high voltage winding 16. The circuit of 16 is adequately insulated from the primary circuit. The only disadvantage of the system FIG. 5 compared to the other systems is the added cost of the 2-winding transformer, which is more expensive than an autotransformer. This extra cost is, however, totally or at least partially compensated for by the lower cost of the capacitor for a still higher voltage than FIG. 2 for example will permit.

FIG. 6 represents a case where the power line voltage is a high voltage, say 15 kV class or below. The solution shown is the use of a two-winding variable transformer, with the primary 17 being a high voltage fixed winding, and the secondary 3 being a low voltage variable ratio winding.

Figure 7:
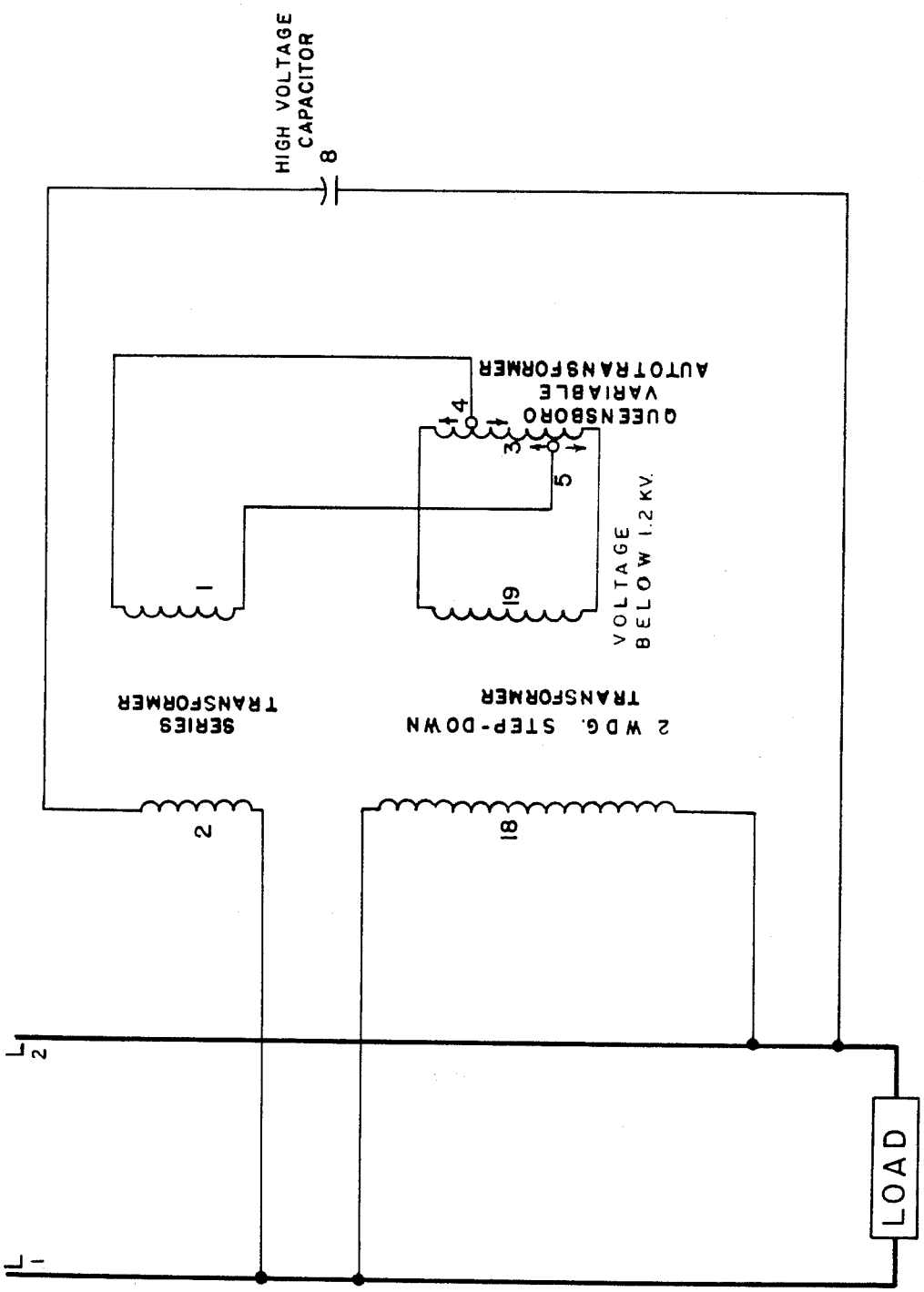
FIG. 7 pursues the same purpose as FIG. 6, and constitutes an alternative adaptation of FIG. 2.

FIG. 7 shows a solution with a two-winding fix-ratio transformer, with the primary 18, and the secondary 19 feeding a low voltage variable transformer. The system shown in FIG. 7 can be applied to line voltages higher than with the diagram represented by FIG. 6. The control system for FIGS. 4 to FIG. 7, basically remains the same as for FIGS. 1, 2 and 3.

Having thus described the invention, it should be apparent that numerous structural modifications are contemplated as being a part of this invention as set forth herein above and is defined herein below by the claims.

What is claimed is:

1. A power-factor correction system for reactive power control and concomitant power factor correction adapted to cooperate with a line supplying power at a given line voltage from power generating means to an inductive load via a given path, comprising in combination, reactive power compensation means in shunt with said line supplying power, and adapted to be connected in shunt with said inductive load, and including fixed capacitance means, and voltage applying means delivering a voltage of continuously variable magnitude in a stepless manner to said fixed capacitance means in response to any change in lagging reactive power consumed by said load so as to correct the magnitude of the power factor in said line supplying power to said inductive load to a predetermined correction value as a result of said power compensation means generating thereacross a compensatory reactive power in proportion to the square of said voltage of variable magnitude delivered to said fixed capacitance means so as to at least partly off-set said lagging reactive power, whereby power factor correction is optimized, yet not producing any transient.

2. The power-factor correction system as claimed in claim 1, wherein the power supplying line has a rated voltage, and wherein said fixed capacitance means comprises a single capacitor having a higher voltage rating than the rated voltage of the power supplying line.

3. The power-factor correction system as claimed in claim 1, wherein said line is a polyphase line, wherein said reactive power compensation means include multiphase reactive power compensation means connected to respective phases of said polyphase line, said fixed capacitance means include a plurality of capacitors connected to respective phases of said multiphase power compensation means, and said voltage applying means include multiphase voltage applying means connected to respective phases of said polyphase line.

4. The power-factor correction system as claimed in claim 1, wherein said voltage of variable magnitude delivered by said voltage applying means to said fixed capacitance means is such that said leading reactive power generated by said reactive power compensation means offsets said lagging reactive power substantially completely, so that said predetermined correction value is a power factor of about unity.

5. The power-factor correction system as claimed in claim 1, wherein said voltage applying means include a series transformer, having isolated primary and secondary windings, said secondary winding being connected in series with said given line voltage from said power supplying line so as to provide a feed voltage for said capacitance means, and a variable transformer fed from said power supply line and feeding said primary winding of said series transformer with a first variable voltage, so as to, in turn, induce a second variable voltage in phase with said power supplying line in said secondary winding, whereby a corrective leading power having a magnitude proportional to the square of the algebraic sum of the given line voltage and of said second in-phase variable voltage is applied to said capacitance means, and whereby any lagging reactive power in said power supplying line is offset by said leading reactive power produced by said system.

6. The power-factor correction system as claimed in claim 5, further comprising a pre-boost autotransformer fed from said power supplying line, and having an output connected ahead of the said secondary winding of said series transformer so as to act as a voltage range shifting device with respect to any voltage range applied to said fixed capacitance means.

7. The power-factor correction system as claimed in claim 5, wherein the power supplying line is a low voltage class ANSI 1.2 kV line, and wherein said fixed capacitance means is rated for a high voltage of the order of 15 kV, and further comprising a two-winding step-up transformer fed from said low voltage line having an output connected ahead of the secondary winding of said series transformer so as to act as a high voltage increasing device with respect to the voltage applied to said fixed capacitance means, whereby a very large reactive power is compensatable.

8. The power-factor correction system as claimed in claim 5, wherein the power supplying line has a voltage higher than the ANSI 1.2 kV class, wherein said primary winding of said series transformer is a low voltage winding, and wherein said variable transformer comprises two isolated windings, one winding being a primary high voltage winding connected across the high voltage power supplying line, the other winding being a secondary low voltage variable output winding feeding the primary winding of said series transformer.

9. The power-factor correction system as claimed in claim 5, wherein said variable transformer is a low-voltage autotransformer, and the power supplying line has a voltage higher than the ANSI 1.2 kV class, wherein the primary winding of said series transformer is a low voltage winding, and further comprising an isolated two-winding fixed ratio transformer, having a primary high voltage winding connected across the power supplying line, and having a secondary low voltage winding feeding said variable transformer.

10. The power-factor correction system as claimed in claim 5, further comprising a turn-on control system fed from said power supplying line for ensuring that the voltage delivered to said fixed capacitance means at the moment of power turn-on is a lowest available voltage, said turn-on control system comprising:
   voltage detection means, including regulation means responsive to the presence of line voltage on said power supplying line, for disconnecting said variable voltage transformer from said power supplying lines upon of absence of power, said variable voltage transformer thereby becoming a damping load across said series transformer primary winding, whereby said series transformer secondary winding acts as a primary winding, and said primary winding acts as a secondary winding, while said variable voltage transformer is disconnected from said power supplying line, and concurrently said voltage detection means disabling itself, disabling said regulation means, and disabling said power factor correcting means;
   enabling means responsive to restoration of power for setting said variable voltage transformer to its lowest voltage; and
   means operative subsequently to settling of said variable voltage transformer to said lowest voltage for reconnecting said variable voltage transformer to said power supplying line, and for subsequent restoration of said primary winding and of said secondary winding of said series transformer to their normal respective functions, and re-enabling of said regulation means, whereupon normal operation of said power-factor correction system is resumed.

11. The power-factor correction system as claimed in claim 5, wherein said voltage applying means comprises regulation means, said regulation means including
   sensing means for sensing any change in reactive power consumed by said load, and for producing a sensing signal,
   means generating a reference signal, and
   comparator means comparing the reference signal to the sensing signal resulting in an output in dependence of said sensing signal and said reference signal so as to produce an error detection signal of a definite magnitude having a positive or negative sign,
   said variable transformer having control means accepting the output of said comparator means, thereby controlling the first variable voltage of said variable transformer.

12. The power-factor correction system as claimed in claim 11, wherein said variable transformer includes
   at least one coil column,
   two rolling current collectors gliding continuously on said coil column, one current collector travelling at a predetermined speed in one direction, the other set travelling in a direction opposite to said one direction at a speed equal to said predetermined speed, said directions being reversible so that an essentially infinite variation of the magnitude, and a reversal of polarity of said first variable voltage, respectively, are obtained.

13. The power-factor correction system as claimed in claim 11 for use in connection with a single-phase power system, wherein each coil column has two current collectors.

14. The power-factor correction system as claimed in claim 11 for use in connection with a three-phase power system, wherein each coil column has two carbon collectors.

15. The power-factor correction system as claimed in claim 11, wherein said variable transformer includes a single sliding current collector, and a winding provided with a center tap.

16. The power-factor correction system as claimed in claim 12, wherein said control means includes a reversible electric motor in driving connection with said current collectors.

17. The power-factor correction system as claimed in claim 16, wherein said reversible electric motor is a single phase motor.

18. The power-factor correction system as claimed in claim 16, wherein said reversible electric motor is a polyphase motor.

19. The power-factor correction system as claimed in claim 16, wherein said reversible electric motor is a direct current motor.

20. The power-factor correction system as claimed in claim 16, further comprising automatic control circuitry controlling the operation of said electric motor, with recourse means to revert to manual operation.

* * * * *